United States Patent [19]
Van Ngo

[11] Patent Number: 5,984,147
[45] Date of Patent: Nov. 16, 1999

[54] ROTARY DISPENSING PUMP

[75] Inventor: Hoang Van Ngo, Santa Ana, Calif.

[73] Assignee: Raytheon Company, Lexington, Mass.

[21] Appl. No.: 08/954,657

[22] Filed: Oct. 20, 1997

[51] Int. Cl.$^6$ .................................................. G01F 11/20
[52] U.S. Cl. .......................... 222/240; 222/242; 222/413
[58] Field of Search .................................... 222/240, 241, 222/242, 413

[56] References Cited

U.S. PATENT DOCUMENTS

| | | | |
|---|---|---|---|
| 3,183,553 | 5/1965 | Slater | 222/242 X |
| 4,796,440 | 1/1989 | Shiotani et al. | 222/242 X |

Primary Examiner—Gregory L. Huson
Attorney, Agent, or Firm—Leonard A. Alkov; William C. Schubert; Glen H. Lenzen, Jr.

[57] ABSTRACT

A rotary pump that may be used in manual or automatic dispensing systems to dispense material such as epoxy or solder paste, and the like. The rotary pump has a feed screw shaft with fins disposed in a mixing chamber that mixes the epoxy or solder paste. Epoxy or solder paste disposed in a container is forced by air pressure from the container through a feed shaft to the mixing chamber. The feed screw shaft and fins are driven by a motor that rotates the shaft and fins to blend the epoxy or solder paste in the mixing chamber. The epoxy or solder paste is forced out of a dispensing tip onto an article by the rotary motion of the feed screw shaft. Therefore, mixing of the epoxy or solder paste is achieved just prior to the point of application. The rotary pump keeps the epoxy or solder paste thoroughly blended before it is dispensed.

9 Claims, 2 Drawing Sheets

ROTARY DISPENSING PUMP

BACKGROUND

The present invention relates generally to pumps, and more particularly, to a rotary pump especially designed to dispense epoxy or solder paste.

The assignee of the present invention manufactures automatic dispensing systems that employ pumps to dispense fluids, such as epoxy, during manufacturing. One such system is a model 3500 Automatic Dispensing System that is used to dispense conductive epoxy during multichip module (MCM) die and capacitor attachment processes.

A problem that has been found in the epoxy dispensing process is that separation occurs between the binders, the silver and the resin used in the epoxy. The separation of the epoxy is due to the large density difference between the silver particles and the epoxy resin.

Separation is especially severe for conductive epoxy because of the large density difference between silver particles and epoxy resin. When separation occurs, it can cause inconsistency of the bond line thickness, die flatness and thermal dissipation of the multichip module.

Accordingly, it is an objective of the present invention to provide for an improved rotary pump designed to dispense epoxy or solder paste.

SUMMARY OF THE INVENTION

To meet the above and other objectives, the present invention provides for an improved rotary pump that may be used in automatic dispensing systems, and the like. The rotary pump is comprised of a feed screw shaft with fins and a mixing chamber used to mix epoxy or solder paste, and that is located in a body of the rotary pump. Epoxy or solder paste is disposed in a container or barrel. Air pressure from an air supply forces the epoxy out of the container or barrel through a vertical feed and a feed shaft to the mixing chamber. The feed screw shaft and its fins are driven by a motor which rotates the shaft and fins to thoroughly blend the epoxy or solder paste in the mixing chamber. The epoxy or solder paste is forced out of a dispensing tip onto an article by the rotary motion of the feed screw shaft. Therefore, mixing of the epoxy or solder paste is substantially achieved at the point of application. The present rotary pump keeps silver and the epoxy resin or in the solder paste thoroughly blended before it is dispensed.

The present pump may be used in the conjunction with the aforementioned model 3500 automatic dispensing system, for example, manufactured by the assignee of the present invention. The present pump may also be used in any other manual or automatic dispense system that is designed to dispense epoxy or solder paste.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
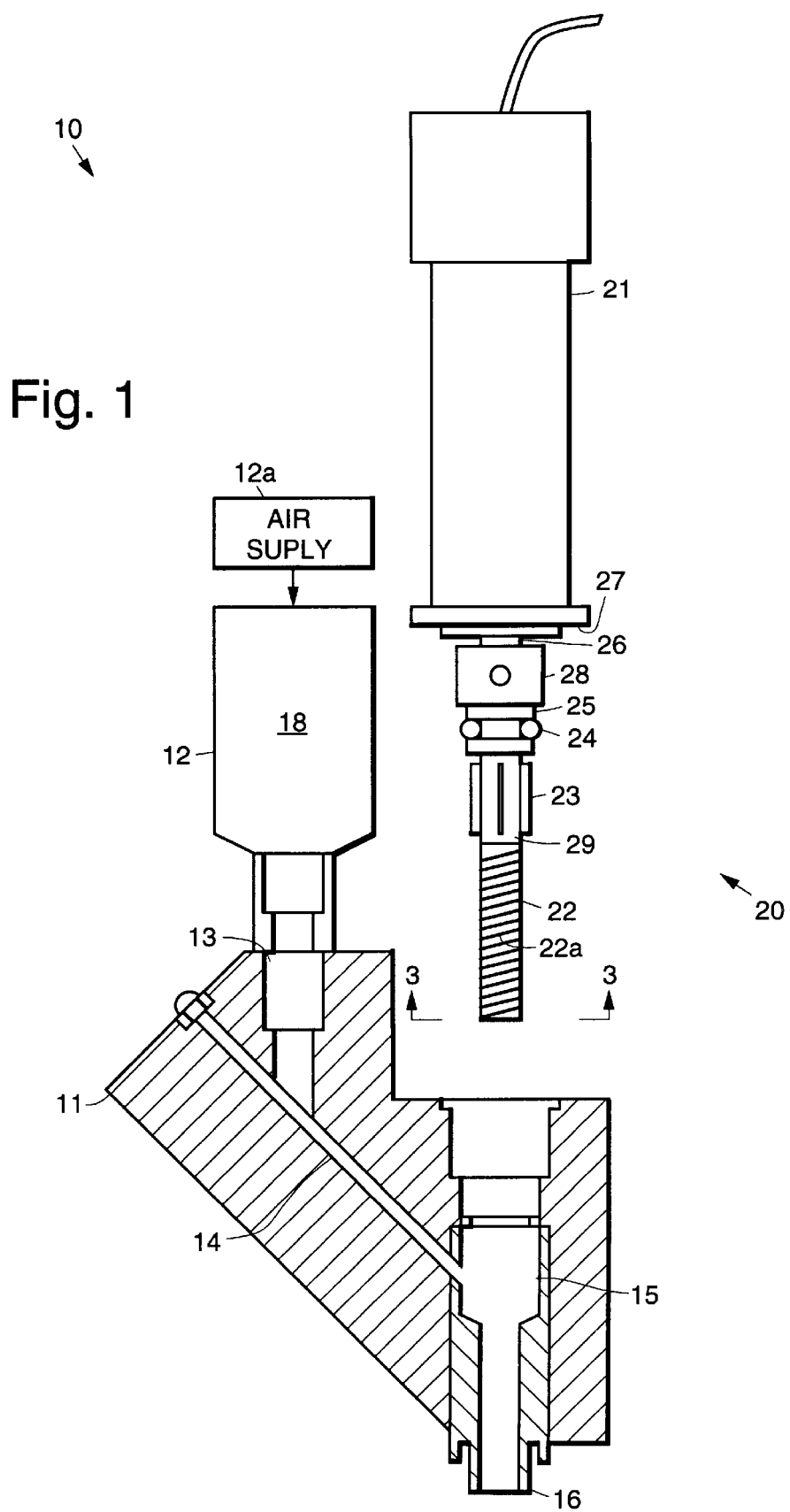
FIG. 1 illustrates a partially exploded view of an improved rotary pump in accordance with the principles of the present invention.
Figure 2:
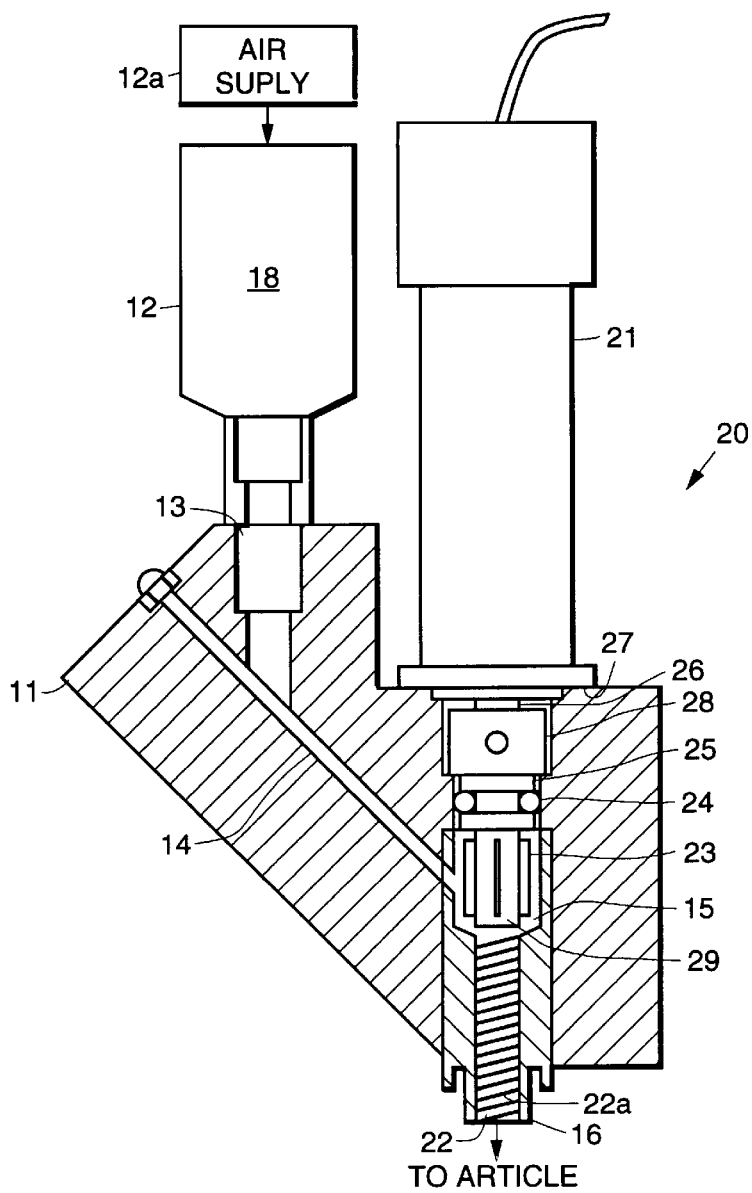
FIG. 2 illustrates a fully assembled rotary pump in accordance with the principles of the present invention.

Referring to the drawing figures, FIG. 1 illustrates a partially exploded view of an improved rotary pump 10 in accordance with the principles of the present invention. FIG. 2 illustrates a fully assembled rotary pump 10.

The rotary pump 10 comprises a housing 11 which may be made of metal, for example, that has a container 12 or barrel 12 that is used to hold a material 18 such as epoxy 18 or solder paste 18 prior to dispensing. The container 12 is coupled to an air supply 12a that supplies air pressure to dispense the material 18. The container 12 is coupled by way of a vertical feed chamber 13 to a feed shaft 14. The feed shaft 14 is coupled to a mixing chamber 15. The mixing chamber 15 is a portion of a plurality of coaxially formed holes in the housing 11. The plurality of coaxially formed holes comprise a plurality of bored cylindrical holes (bored from the top of the housing 11) and a counterbored cylindrical hole (bored from the bottom of the housing 11). A dispensing tip 16 is disposed in the counterbored cylindrical hole and protrudes from the bottom of the housing 11.

A motor and dispensing assembly 20 comprises a motor 21 having a mounting surface 27 that abuts an upper surface of the housing adjacent the bored cylindrical holes, and an output shaft 26. A feed screw shaft 22 has a coupler 28 that secures it to the output shaft 26 of the motor 21. The feed screw shaft 22 comprises a bearing 25 adjacent to the coupler 28 that secures an O-ring seal 24 therein that seals the interface between the top portion of the housing 11 and the feed screw shaft 22. A plurality of fins are secured to the feed screw shaft 22 adjacent (just below) to the bearing 25 and O-ring seal 24. The bottom portion of the feed screw shaft 22 has a plurality of threads 22a that are used to move the material that is dispensed to the dispensing tip 16 of the rotary pump 10. The plurality of fins secured to the feed screw shaft 22 are located in the mixing chamber 15 formed in the housing 11.

In operation, air pressure from the air supply 12a forces the epoxy 18 or solder paste 18 out of the container 12 or barrel 12 through the vertical feed chamber 13 and the feed shaft 14 to the mixing chamber 15. The feed screw shaft 22 and its fins 23 are driven by the motor 21 which rotates the feed screw shaft 22 and fins 23 to thoroughly blend the epoxy 18 or solder paste 18 in the mixing chamber 15. The epoxy 18 or solder paste 18 is forced out of a dispensing tip 16 onto an article by the rotary motion of the feed screw shaft 22.

In the present invention, mixing of the epoxy 18 or solder paste 18 is achieved substantially at the point of application, i.e., in the mixing chamber 15 just prior to application. The rotary pump 10 keeps silver in the epoxy resin or in the solder paste thoroughly blended before it is dispensed.

The rotary pump 10 may be used in the conjunction with a model 3500 automatic dispensing system, for example, manufactured by the assignee of the present invention. The rotary pump 10 may also be used in any other manual or automatic dispense system that is designed to dispense epoxy or solder paste.

Figure 3:
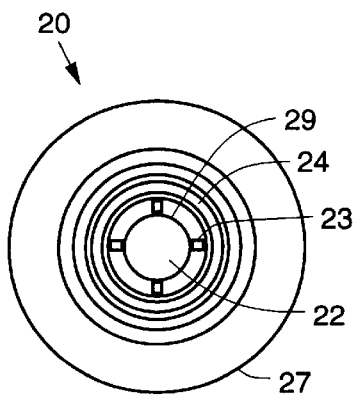
FIG. 3 illustrates an enlarged end view, taken along the lines 3—3 in FIG. 1, of a dispensing assembly of the rotary pump shown in FIGS. 1 and 2.

FIG. 3 illustrates an enlarged end view, taken along the lines 3—3 in FIG. 1, of the dispensing assembly 20 used in the rotary pump 10 shown in FIGS. 1 and 2. FIG. 3 shows the end of the feed screw shaft 22 with the fins 23 extending outwardly therefrom. The O-ring seal 24 is shown along with the mounting surface 27 of the motor and dispensing assembly 20.

Figure 4:
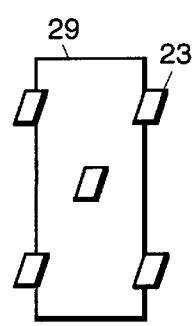
FIGS. 4–6 illustrate different types of fins that may be employed in the present rotary pump.
Figure 5:
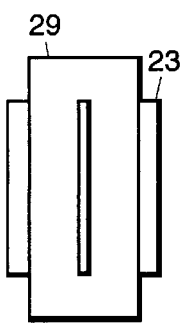
Figure 6:
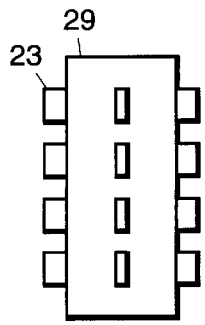

FIGS. 4–6 illustrate different types of fins 23 that may be employed in the rotary pump 10. FIG. 4 shows trapezoidal metal fins 23 that may be welded to the upper surface of the feed screw shaft 22, or trapezoidal plastic fins 23 formed as part of a plastic sleeve 29 that slides over the feed screw shaft 22 and is secured by adhesive to the feed screw shaft 22. FIG. 5 shows elongated rectangular metal fins 23 that may be welded to the upper surface of the feed screw shaft 22, or elongated rectangular plastic fins 23 formed as part of a plastic sleeve 29 that slides over the feed screw shaft 22 and is secured by adhesive to the feed screw shaft 22. FIG. 6 shows short rectangular metal fins 23 that may be welded to the upper surface of the feed screw shaft 22, or short rectangular plastic fins 23 formed as part of a plastic sleeve 29 that slides over the feed screw shaft 22 and is secured by adhesive to the feed screw shaft 22.

Thus, an improved rotary pump designed to dispense epoxy or solder paste has been disclosed that mixes the epoxy or solder paste substantially at the point of application and which keeps epoxy solder paste thoroughly blended before it is dispensed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A rotary pump comprising:

a housing;

a container coupled to the housing for holding a material that is to be dispensed;

an air supply coupled to the container that supplies air pressure to dispense the material;

a feed shaft disposed in the housing coupled to the container by way of a vertical feed chamber;

a mixing chamber coupled to the feed shaft;

a dispensing tip disposed below the mixing chamber;

a motor having an output shaft;

a rotatable feed screw shaft secured to the output shaft that comprises a seal that seals the housing, a plurality of fins that rotate with the feed screw shaft in the making chamber, and a plurality of threads adjacent to the dispensing tip.

2. The rotary pump of claim 1 wherein the material comprises epoxy.

3. The rotary pump of claim 1 wherein the material comprises solder paste.

4. The rotary pump of claim 1 wherein the fms comprise trapezoidal metal fins.

5. The rotary pump of claim 1 wherein the fins comprise elongated rectangular metal fins.

6. The rotary pump of claim 1 wherein the fins comprise short rectangular metal fins.

7. The rotary pump of claim 1 wherein the fins comprise trapezoidal plastic fins formed as part of a plastic sleeve that and is secured to the feed screw shaft.

8. The rotary pump of claim 1 wherein the fins comprise rectangular plastic fins formed as part of a plastic sleeve that is secured to the feed screw shaft.

9. The rotary pump of claim 1 wherein the fins comprise short rectangular plastic fins formed as part of a plastic sleeve that is secured to the feed screw shaft.

* * * * *